USO12497310B2

United States Patent
Harlev

(10) Patent No.: US 12,497,310 B2
(45) Date of Patent: Dec. 16, 2025

(54) HYPOCHLORITE-MEDIATED SINGLE ENZYME METHODS FOR CYANURIC ACID REMOVAL FROM WATER

(71) Applicant: Ilana Harlev, Rehovot (IL)

(72) Inventor: Ilana Harlev, Rehovot (IL)

(*) Notice: Subject to any disclaimer, the term of this patent is extended or adjusted under 35 U.S.C. 154(b) by 462 days.

(21) Appl. No.: 17/799,673

(22) PCT Filed: Feb. 10, 2021

(86) PCT No.: PCT/IL2021/050158
§ 371 (c)(1),
(2) Date: Aug. 14, 2022

(87) PCT Pub. No.: WO2021/161307
PCT Pub. Date: Aug. 19, 2021

(65) Prior Publication Data
US 2023/0084093 A1    Mar. 16, 2023

Related U.S. Application Data

(60) Provisional application No. 62/975,779, filed on Feb. 13, 2020.

(51) Int. Cl.
*C02F 1/76*    (2023.01)
*C02F 3/34*    (2023.01)
*C02F 101/38*  (2006.01)
*C02F 103/42*  (2006.01)

(52) U.S. Cl.
CPC .............. *C02F 1/76* (2013.01); *C02F 3/341* (2013.01); *C02F 3/34* (2013.01); *C02F 2101/38* (2013.01); *C02F 2103/42* (2013.01); *Y02W 10/37* (2015.05)

(58) Field of Classification Search
CPC .... C02F 1/76; C02F 3/341; C02F 3/34; C02F 2101/38; C02F 2103/42; Y02W 10/37
USPC .................................................. 210/754, 756
See application file for complete search history.

(56) References Cited

U.S. PATENT DOCUMENTS

| | | | | |
|---|---|---|---|---|
| 3,397,203 A | * | 8/1968 | Vazopolos | C07D 251/36 544/190 |
| 4,387,029 A | * | 6/1983 | Huber | C02F 1/76 210/758 |
| 5,429,949 A | * | 7/1995 | Radosevich | C12N 1/00 210/612 |
| 5,948,315 A | | 9/1999 | Yang | |
| 2010/0270228 A1 | * | 10/2010 | Teichberg | C12Y 305/02015 435/231 |
| 2013/0134104 A1 | | 5/2013 | Forstmeier | |

FOREIGN PATENT DOCUMENTS

| | | |
|---|---|---|
| RU | 2122740 | 11/1998 |
| WO | 2003106400 | 12/2003 |

OTHER PUBLICATIONS

Machine-generated English translation of RU 2122740, generated on Dec. 4, 2024.*

(Continued)

*Primary Examiner* — Fred Prince
(74) *Attorney, Agent, or Firm* — JMB Davis Ben-David

(57) ABSTRACT

Described herein are methods for eliminating biuret from an environment such as a body of water, through treatment with an effective amount of a hypochlorite. Additionally described herein are methods of eliminating biuret resulting from enzymatic degradation of CYA in an aqueous solution.

17 Claims, 5 Drawing Sheets

Specification includes a Sequence Listing.

(56) References Cited

OTHER PUBLICATIONS

Aukema, Kelly G., et al. "Cyanuric acid biodegradation via biuret: Physiology, taxonomy, and geospatial distribution." Applied and environmental microbiology 86.2 (2020): e01964-19.
Fenton, Henry John Horstman. "XXXVI.—Action of hypochlorites on urea." Journal of the Chemical Society, Transactions 33 (1878): 300-303.
Fenton, H. J. H. "II.—Comparison of the actions of hypochlorites and hypobromites on some nitrogen-compounds." Journal of the Chemical Society, Transactions 35 (1879): 12-16.
Foster, William. "XVI.—The action of alkaline hypobromite on oxamide, urea, and potassium ferrocyanide. Part II." Journal of the Chemical Society, Transactions 35 (1879): 119-124.
Karayannis, M. I., and E. V. Kordi. "A simple reaction-rate method for the determination of biuret." Analyst 100.1188 (1975): 168-172.
Blatchley III, Ernest R., and Mingming Cheng. "Reaction mechanism for chlorination of urea." Environmental science & technology 44.22 (2010): 8529-8534.
Francis, Paul, and Kieran Lim. "Conversion of urea to hydrazine: Hofmann reaction or Favorskii analogue? Exploring reaction mechanism through isotopic labeling studies." Chemical educator 12.5 (2007): 307-313.
Zaidi et al. "Hofmann Reaction Studies of Biuret" Islamabad J. Sci. 1977, vol. 4.
Schirmann, J. P., and P. Bourdauducq. Hydrazine, Ullmann's Encyclopedia of Industrial Chemistry.(2001). vol. 8.

* cited by examiner

SEQUENCE LISTING

<160> NUMBER OF SEQ ID NOS: 1

<210> SEQ ID NO 1
<211> LENGTH: 363
<212> TYPE: PRT
<213> ORGANISM: Pseudomonas sp. NRRL B-12228

<400> SEQUENCE: 1

```
Met Tyr His Ile Asp Val Phe Arg Ile Pro Cys His Ser Pro Gly Asp
1               5                   10                  15

Thr Ser Gly Leu Glu Asp Leu Ile Glu Thr Gly Arg Val Ala Pro Ala
            20                  25                  30

Asp Ile Val Ala Val Met Gly Lys Thr Glu Gly Asn Gly Cys Val Asn
        35                  40                  45

Asp Tyr Thr Arg Glu Tyr Ala Thr Ala Met Leu Ala Ala Cys Leu Gly
    50                  55                  60

Arg His Leu Gln Leu Pro Pro His Glu Val Lys Arg Val Ala Phe
65                  70                  75                  80

Val Met Ser Gly Gly Thr Glu Gly Val Leu Ser Pro His His Thr Val
                85                  90                  95

Phe Ala Arg Arg Pro Ala Ile Asp Ala His Arg Pro Ala Gly Lys Arg
            100                 105                 110

Leu Thr Leu Gly Ile Ala Phe Thr Arg Asp Phe Leu Pro Glu Glu Ile
        115                 120                 125

Gly Arg His Ala Gln Ile Thr Glu Thr Ala Gly Ala Val Lys Arg Ala
    130                 135                 140

Met Arg Asp Ala Gly Ile Ala Ser Ile Asp Leu His Phe Val Gln
145                 150                 155                 160

Val Lys Cys Pro Leu Leu Thr Pro Ala Lys Ile Ala Ser Ala Arg Ser
                165                 170                 175

Arg Gly Cys Ala Pro Val Thr Thr Asp Thr Tyr Glu Ser Met Gly Tyr
            180                 185                 190

Ser Arg Gly Ala Ser Ala Leu Gly Ile Ala Leu Ala Thr Glu Glu Val
        195                 200                 205

Pro Ser Ser Met Leu Val Asp Glu Ser Val Leu Asn Asp Trp Ser Leu
    210                 215                 220

Ser Ser Ser Leu Ala Ser Ala Ser Ala Gly Ile Glu Leu Glu His Asn
225                 230                 235                 240

Val Val Ile Ala Ile Gly Met Ser Glu Gln Ala Thr Ser Glu Leu Val
                245                 250                 255

Ile Ala His Gly Val Met Ser Asp Ala Ile Asp Ala Ala Ser Val Arg
            260                 265                 270

Arg Thr Ile Glu Ser Leu Gly Ile Arg Ser Asp Asp Glu Met Asp Arg
        275                 280                 285

Ile Val Asn Val Phe Ala Lys Ala Glu Ala Ser Pro Asp Gly Val Val
    290                 295                 300

Arg Gly Met Arg His Thr Met Leu Ser Asp Ser Asp Ile Asn Ser Thr
305                 310                 315                 320

Arg His Ala Arg Ala Val Thr Gly Ala Ala Ile Ala Ser Val Val Gly
                325                 330                 335

His Gly Met Val Tyr Val Ser Gly Gly Ala Glu His Gln Gly Pro Ala
            340                 345                 350

Gly Gly Gly Pro Phe Ala Val Ile Ala Arg Ala
        355                 360
```

HYPOCHLORITE-MEDIATED SINGLE ENZYME METHODS FOR CYANURIC ACID REMOVAL FROM WATER

CROSS-REFERENCE TO RELATED APPLICATIONS

This is the U.S. National Stage of International Patent Application No. PCT/IL2021/050158 filed on Feb. 10, 2021, which in turn claims benefit to U.S. Provisional Patent Application No. 62/975,779, filed Feb. 13, 2020, which is incorporated by reference herein in its entirety.

FIELD

Provided herein are methods for removing biuret from an environment, such as a body of water.

BACKGROUND

Maintaining the water quality in a man-made or natural reservoir of water presents a considerable challenge in which a critical balance has to be preserved between the various oxidizers, sanitizers, clarifiers, conditioners, disinfectants, and deodorants that are added to the water or are a by-product formed by cleansing products used. The half-life in a pool of water of most chemicals is determined by their chemical and/or photochemical degradation, evaporation and/or removal by filtration, backwashing, drainage, spillage, and sedimentation.

Chlorine as such, or in its various forms, is the main sterilization chemical used to control unwanted bacterial and algal growth in closed or semi-closed water reservoirs. The amount of chlorine required to maintain an effective microbicidal chlorine level in swimming pool water for example, depends in part on the chlorine demand of the water, e.g., from pollution brought in by bathers. Additional factors that increase chlorine demand are windblown dust, leaves, grass clippings, and other environmental contaminants.

Hypochlorous acid, (HClO), a common source of free chlorine, is typically used as an aggressive oxidizing and chlorinating agent for various applications, including water purification systems. However, hypochlorous acid is highly unstable, and readily decomposes into inactive breakdown products, such as hydrochloric acid, water and oxygen, via UV radiation-driven photochemical reactions upon exposure to direct sunlight, and/or upon exposure to moderate and high temperatures. During the summer up to 90% of the total active chlorine species in a typical outdoor swimming pool are lost in a sunny day over two to three hours.

The use of cyanuryl chloride, which continuously releases active chlorine, stabilizes and thus slows the degradation process of chlorine by sunlight in water treatment systems. As cyanuryl chloride is consumed it is converted into cyanuric acid (CYA) and additional cyanuryl chloride must be continuously added.

However, excessive amounts of CYA reduce the levels of free chlorine, interfering with its disinfection function. This phenomenon, known as "chlorine-lock," occurs when the concentration of CYA reaches over 100 ppm (0.77 mM). In swimming pool water, the effects of chlorine-lock are similar to inadequately low chlorine levels, resulting in clouding of the pool's water due to bacterial growth, which is a clear indication that the water is no longer safe for use.

Once added to a pool, CYA does not dissipate or degrade substantially. It is removed from the water only by splash-out and backwash waste procedures or dilution. Typically, CYA concentration is lowered by draining part of the pool's water and diluting what remains with fresh water. If the CYA level considerably exceeds 100 ppm, it is a general practice to partially or totally drain the pool, and to scrub its inner-walls (to remove CYA that sediment on the sides of the pool). This time-consuming and water-wasteful process is extremely costly not only in terms of water, but also in loss of a pool's operational time, addition of cyanuryl chloride is required, and the so-far unavoidable reiterative nature of the overall process is needed to maintain the balance between the concentration of reactive chlorine species.

Thus, there remains a continuing need for a safe, cost effective, environmentally-friendly method for the removal of CYA and/or its by-products, such as its metabolite biuret, from water without the need for the either entire or partial removal of the water.

SUMMARY

Described herein, are methods for eliminating biuret from aqueous solutions, including providing an effective amount of a composition comprising a hypochlorite to a biuret-containing liquid, thereby eliminating the biuret.

Additional methods described herein are methods for eliminating cyanuric acid (CYA) from liquids including providing an effective amount of an agent to the liquid that biodegrades CYA to biuret, wherein the agent can be one microbial cell culture, a cell extract thereof, a soluble protein fraction thereof, and CYA amidohydrolase; and subsequently providing an effective amount of a hypochlorite, thereby eliminating the cyanuric acid and the resultant biuret.

The foregoing and other objects, features, and advantages will become more apparent from the following detailed description, which proceeds with reference to the accompanying figures.

Lane 5: Biuret (from stock tube) alone. Biuret band was detected.
Lane 6: Biuret (from stock tube) treated with NaOCl 20 mg/mL. Biuret band disappeared.
Lane 7: Biuret (from 16 mM stock tube). Biuret band was detected.
The TLC plate was stained with sodium nitroprussate that stains biuret but not CYA.

Figure 5:
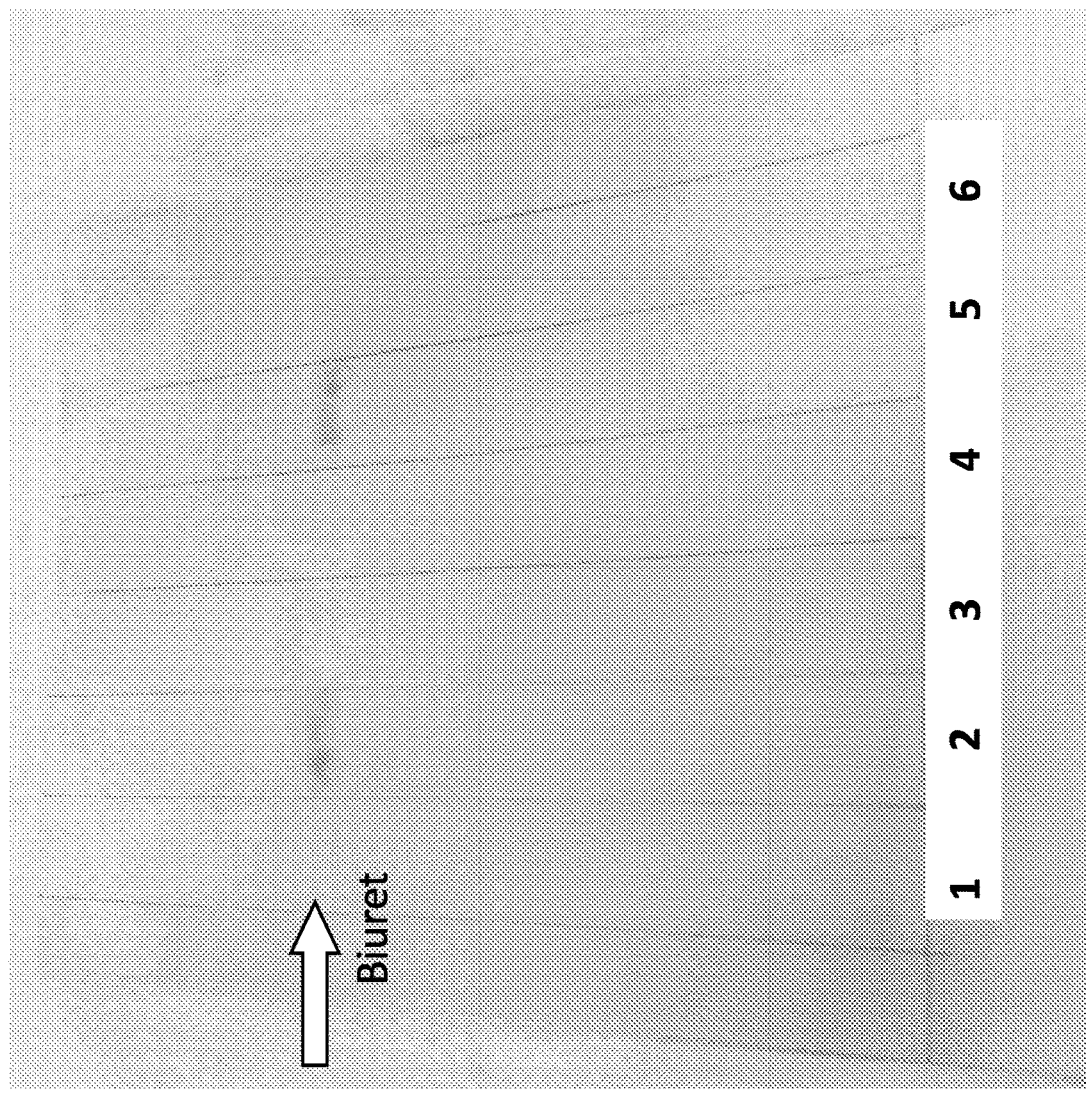

FIG. 5 shows that biuret produced by enzymatic degradation of CYA in swimming pool water is effectively removed by overnight super-chlorination.
Lane 1: CYA alone. No stained band was detected.
Lane 2: CYA treated with CYA amidohydrolase that produces biuret. Biuret band was detected.
Lane 3: CYA treated with CYA amidohydrolase that produces biuret and then with NaOCl 20 mg/mL. The biuret band disappeared.
Lane 4: NaOCl 20 mg/ml alone. No stained band was detected.
Lane 5: Biuret (from stock tube) alone. Biuret band was detected.
Lane 6: Biuret (from stock tube) treated with NaOCl 20 mg/mL. The biuret band disappeared.
The TLC plate was stained with sodium nitroprussate that stains biuret but not CYA.

BRIEF DESCRIPTION OF DESCRIBED SEQUENCES

The amino acid sequences provided herewith are shown using standard letter abbreviations and three letter code for amino acids, as defined in 37 C.F.R. 1.822. It will be understood that though not shown, amino acid sequences implicitly describe the corresponding encoding nucleic acid sequences (including codon variations).

SEQ ID NO: 1 is the amino acid sequence of *Pseudomonas* sp. NRRL B-12228 CYA amidohydrolase.

DETAILED DESCRIPTION

I. Abbreviations

CYA Cyanuric acid
PPM Parts per million
UPW Ultra-Pure Water
CE Crude cell extract

II. Terms

Unless otherwise noted, technical terms are used according to conventional usage. Definitions of common terms in molecular biology can be found in Benjamin Lewin, *Genes V*, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.), *Molecular Biology and Biotechnology: A Comprehensive Desk Reference*, published by VCH Publishers, Inc., 1995 (ISBN 1-56081-569-8).

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. It is further to be understood that all base sizes or amino acid sizes, and all molecular weight or molecular mass values, given for nucleic acids or polypeptides are approximate, and are provided for description. Although methods and materials similar or equivalent to those described herein can be used in the practice or testing of this disclosure, suitable methods and materials are described below. The term "comprises" means "includes." "Consisting essentially of" indicates a composition, method, or process that includes only those listed features as the active or essential elements, but can include non-active elements in addition. The abbreviation, "e.g." is derived from the Latin exempli gratia, and is used herein to indicate a non-limiting example. Thus, the abbreviation "e.g." is synonymous with the term "for example." The term "about" indicates an amount within + or −5% of the expressly stated amount.

In case of conflict, the present specification, including explanations of terms, will control. In addition, all the materials, methods, and examples are illustrative and not intended to be limiting.

Biuret: Also known as Allophanamide, is a chemical compound ($C_2H_5N_3O_2$) which results from a condensation reaction of two molecules of urea, and resultant loss of an ammonia molecule. Biuret is also the product obtained by treatment of CYA with the enzyme CYA amidohydrolase.

Contacting: Placement in direct physical association. Includes both in solid and liquid form.

Cell culture extract: Interchangeably used herein with "soluble crude extract," "cell extract," or "extract." Refers to a fraction of a bacterium derived from the cytosol. For example, the soluble crude extract may be obtained by lysis of bacteria by any means known in the art, centrifugation of the lysed bacteria and collection of the supernatant. In certain embodiments, the soluble crude extract is in the form of a powder, such as a lyophilized powder. It should be understood that soluble crude extract is substantially void of intact cells and that the enzymes present in the soluble crude extract are not substantially enclosed in a cell, either dead, alive or cross-linked. This applies also to a protein precipitate of crude extract.

CYA: The common name for 1,3,5-triazine-2,4,6-triol; a molecule having a chemical formula of $(CNOH)_3$. CYA is commonly used as part of water disinfectant systems, either as a precursor to and/or stabilizer of microbicidal chlorine ions. CYA at lower concentrations (around 30 ppm) acts as an effective stabilizer; but at higher concentrations, such as 100 ppm, CYA will trap chlorine (a process also described as "chlorine lock"), greatly reducing its efficacy as a water disinfectant.

CYA amidohydrolase: An enzyme that catalyzes the hydrolysis of CYA to biuret and $CO_2$. CYA amidohydrolase is also known in the art as CYA hydrolase. A non-limiting examples includes CYA amidohydrolase (AtzD) from *Pseudomonas* sp. ADP, *Acidovorax citrulli*, *Acidovorax citrulli* 12227, *Pseudomonas* sp. NRRL B-12228, *Cupriavidus basilensis*, *Gordonia rubripertincta*, *Gordonia rubripertincta* DSM 10347/*Williamsia* sp. NRRL B-15444R, *Hormodendrum* sp., *Klebsiella pneumoniae*, *Klebsiella pneumoniae* 90, *Klebsiella pneumoniae* 99, *Moorella thermoacetica*, *Penicillium* spp., *Pseudomonas* sp. (including *Pseudomonas* sp. A and *Pseudomonas aeruginosa*), *Stenotrophomonas* sp. and *Sporothrix schenckii*. CYA amidohydrolase activity has also been classified by the enzyme classification number EC 3.5.2.15.

Effective amount of a compound: A quantity of compound sufficient to achieve a desired effect in an environment, such as a body of water. An effective amount of a compound can be provided in a single amount, or in several amounts.

However, the total effective amount of the compound will be dependent on the compound applied and the desired effect.

Elimination: The term elimination does not require absolute removal of an unwanted substance from a mixture, solution, liquid, water or sample; rather, it is intended as a relative term. Thus, in particular embodiments of the described methods, the elimination of biuret does not require 100% removal of biuret. It can be understood that the elimination of biuret is removal of biuret until ppm levels have been achieved that are considered not to interfere with the active chlorine levels, for example below 10 ppm, optimally 2 ppm or below.

Encode: A polynucleotide is said to "encode" a polypeptide if, in its native state or when manipulated by methods well known to those skilled in the art, it can be transcribed and/or translated to produce the mRNA for and/or the polypeptide or a fragment thereof. The anti-sense strand is the complement of such a nucleic acid, and the encoding sequence can be deduced therefrom.

Expression Control Sequences: Nucleic acid sequences that regulate the expression of a heterologous nucleic acid sequence to which it is operatively linked. Expression control sequences are operatively linked to a nucleic acid sequence when the expression control sequences control and regulate the transcription and, as appropriate, translation of the nucleic acid sequence. Thus, expression control sequences can include appropriate promoters, enhancers, transcription terminators, a start codon (ATG) in front of a protein-encoding gene, splicing signal for introns, and maintenance of the correct reading frame of that gene to permit proper translation of mRNA, and stop codons. A polynucleotide can be inserted into an expression vector (also described herein as a "recombinant plasmid") that contains a promoter sequence, and which facilitates the efficient transcription of the inserted genetic sequence of the host. The expression vector typically contains an origin of replication, a promoter, as well as specific nucleic acid sequences that allow phenotypic selection of the transformed cells.

Functional fragments and variants of a polypeptide: Included are those fragments and variants that maintain one or more functions of the parent polypeptide. It is recognized that the gene or cDNA encoding a polypeptide can be considerably mutated without materially altering one or more the polypeptide's functions. First, the genetic code is well-known to be degenerate, and thus different codons encode the same amino acids. Second, even where an amino acid substitution is introduced, the mutation can be conservative, and result in a polypeptide of equivalent or near-equivalent shape and/or charge, and have no material impact on the essential functions of a protein. Third, part of a polypeptide chain can be deleted without impairing or eliminating all of its functions. Fourth, insertions or additions can be made in the polypeptide chain for example, adding epitope tags, without impairing or eliminating its functions. Other modifications that can be made without materially impairing one or more functions of a polypeptide include, for example, in vivo or in vitro chemical and biochemical modifications or the incorporation of unusual amino acids. Functional fragments and variants can be of varying length. For example, some fragments have at least 10, 25, 50, 75, 100, or 200 amino acid residues.

Gene expression: The process by which the coded information of a nucleic acid transcriptional unit (including, for example, genomic DNA or cDNA) is converted into an operational, non-operational, or structural part of a cell, often including the synthesis of a protein. Gene expression, which is also termed herein as "expression" can occur "genomically," meaning, from a genomic source, whether chromosomal or extrachromosomal. Expression can also occur from a recombinant plasmid or expression vector.

Hypochlorite: A chemical compound with a molecular ion containing chlorine and oxygen. Hypochlorites are alkaline. Common, non-limiting examples of hypochlorites include: sodium hypochlorite, calcium hypochlorite, and potassium hypochlorite.

Isolated: A biological component (such as a nucleic acid molecule, protein or organelle) that has been substantially separated or purified away from other biological components in the cell of the organism in which the component naturally occurs, i.e., other chromosomal and extra-chromosomal DNA and RNA, proteins and organelles. Nucleic acids and proteins that have been isolated include nucleic acids and proteins purified by standard purification methods. The term also embraces nucleic acids and proteins prepared by recombinant expression in a host cell as well as chemically synthesized nucleic acids.

Microbial cell culture: A culture of a microbial cell, whether in solid or liquid form. Thus, in particular embodiments, a microbial cell culture can be a liquid culture, a colony or derived from a colony, or a dried version of a liquid or solid culture.

Operably linked sequence: A first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein-coding regions, in the same reading frame.

Purified: The term purified does not require absolute purity; rather, it is intended as a relative term. Thus, for example, a purified protein preparation is one in which the protein referred to is purer than the protein in its natural environment within a cell.

Recombinant: A nucleic acid that has a sequence that is not naturally occurring or has a sequence that is made by an artificial combination of two otherwise separated segments of sequence. This artificial combination can be accomplished by chemical synthesis or, more commonly, by the artificial manipulation of isolated segments of nucleic acids, e.g., by genetic engineering techniques.

Super-chlorination: As used herein, a process by which a hypochlorite is added to a body of water (i.e. natural or manmade) in an amount between 0.1-10 mg/mL. In a particular embodiment, the hypochlorite concentration is 0.134 mg/mL.

Vector: A nucleic acid molecule as introduced into a host cell, thereby producing a transfected host cell. Recombinant DNA vectors are vectors having recombinant DNA. A vector can include nucleic acid sequences that permit it to replicate in a host cell, such as an origin of replication. A vector can also include one or more selectable marker genes and other genetic elements known in the art. The term vector is used interchangeably herein with "plasmid".

III. Overview of Several Embodiments

Described herein are methods for eliminating biuret from aqueous solutions, which include providing an effective amount of a composition including a hypochlorite to a biuret-containing liquid, thereby eliminating the biuret.

In particular embodiments, the hypochlorite can be sodium hypochlorite, potassium hypochlorite and calcium hypochlorite. In further embodiments, the concentration of sodium hypochlorite is 0.1-10 mg/mL.

In some embodiments the liquid is water in a swimming pool, water slide, spa, hot tub, fountain, decorative waterfall or any other man-made water reservoir.

In some embodiments the liquid is water from a natural reservoir of water.

In particular embodiments, the biuret in the liquid is a resultant product of enzymatic degradation of CYA.

Additionally, described herein are methods for eliminating CYA from liquids. The methods include: providing an effective amount of an agent to the liquid that degrades CYA to biuret, wherein the agent can be at least one microbial cell culture, an extract thereof, a soluble protein fraction thereof, and CYA amidohydrolase; and subsequently providing an effective amount of a hypochlorite, thereby eliminating both CYA and the resultant biuret.

In particular embodiments, the extract providing the CYA amidohydrolase is derived from a single microbial cell culture. In further embodiments, CYA amidohydrolase is expressed by at least one recombinant nucleic acid in a cell culture. In some embodiments, the CYA amidohydrolase is expressed genomically in a microorganism.

In some embodiments, the CYA amidohydrolase is provided by one or more of the following bacterial species: *Acidovorax citrulli*, *Acidovorax citrulli* 12227, *Pseudomonas* sp. NRRL B-12228, *Cupriavidus basilensis*, *Gordonia rubripertincta*, *Gordonia rubripertincta* DSM 10347/NRRLB-15444R, *Williamsia* sp. NRRL B-15444R, *Hormodendrum* sp., *Klebsiella pneumoniae*, *Klebsiella pneumoniae* 90, *Klebsiella pneumoniae* 99, *Moorella thermoacetica*, *Penicillium* spp., *Pseudomonas* sp. (including *Pseudomonas* sp. A and *Pseudomonas aeruginosa*), *Sporothrix schenckii* and *Stenotrophomonas* sp.

In particular embodiments the CYA amidohydrolase is an isolated enzyme or a functional variant thereof. In further embodiments the CYA amidohydrolase is provided from *Pseudomonas* spp, such as strain NRRL B-12228.

In some embodiments, the hypochlorite can be sodium hypochlorite, potassium hypochlorite, and calcium hypochlorite.

In other particular embodiments, the liquid is water from a natural reservoir of water or man-made reservoir of water.

In some embodiments, the concentration of sodium hypochlorite is 0.1-10 mg/mL. In further embodiments the concentration of sodium hypochlorite is about 1 mg/mL.

IV. Elimination of Biuret by Super-Chlorination

Chlorine treatment is the standard approach for purification of a variety of water sources. However, use of chlorine requires the addition of CYA in order to prevent rapid degradation of chlorine by sunlight. Too high concentration of CYA can lead to "chlorine lock", as discussed above, which in turn can lead to polluted and unsafe water. Enzymatic biodegradation of CYA is one method for maintaining effective levels of CYA. However, biodegradation of CYA comes with its own set of challenges, such as the buildup of the hydrolysis byproduct, biuret, which also binds active chlorine, resulting in chlorine lock.

Amide-containing compounds are not normally degraded by hypochlorites. However, described herein is the unexpected observation that the amide-containing compound biuret can be degraded and even eliminated by reaction with hypochlorite. In view of this observation, disclosed herein are methods for eliminating biuret from an aqueous solution through providing an effective amount of a composition comprising a hypochlorite to a biuret-containing liquid, thereby eliminating the biuret. In developing the described methods, it was also observed that the presence and degradation of biuret in a solution can be observed through use of newly-developed methods of thin layer chromatography (TLC). In the TLC methods described herein, following standard TLC separation, plates are treated with sodium nitroprussate and potassium hexacyanoferrate or toluidine to visualize the presence of biuret. Accordingly, the described methods encompass methods in which the treatment of water to remove biuret is monitored by use of the described TLC methodology. Likewise, hypochlorite-containing compositions and biuret-detecting reagents, as described herein, can be provided in a kit for use in eliminating biuret from a water source.

As used herein, "hypochlorite" is meant to include any of the forms of hypochlorite, namely any chemical form of a hypochlorite (free hypochlorous acid or any salt thereof) and any physical form (liquid, solution, gel or crystalline salt). Compounds or complexes that release hypochlorite. In some embodiments, the hypochlorite used can be sodium hypochlorite, potassium hypochlorite or calcium hypochlorite.

According to some embodiments of the present disclosure, hypochlorite can be used in a form of any alkali salt of hypochlorous acid such as sodium salt or calcium salt, or as hypochlorous acid. Household hypochlorite available as a 3-6% solution of sodium hypochlorite, can be used in the context of some embodiments of the present disclosure. Similarly, a 12% sodium hypochlorite solution, which is widely used in waterworks for the chlorination of water, and a 15% solution which is more commonly used for disinfection of waste water in treatment plants, are also useful in the context of the present embodiments. High-test hypochlorite (HTH) is available for chlorination of swimming pools and contains approximately 30% calcium hypochlorite. Also useful in the context of embodiments of the present disclosure are thickened alkali metal hypochlorite compositions and gels, such as those disclosed in, for example, U.S. Pat. Nos. 4,561,994; 4,986,926; 5,688,756; 6,451,253; and 7,622,434. Crystalline salts of hypochlorite, typically containing about 50% of calcium hypochlorite, are also useful in the context of the present embodiments.

The concentrations of hypochlorite solutions are commonly referred to in terms of weight content (mass), such as parts per million (ppm), the conversion from ppm to molar (moles per liter) is readily determined by dividing the value in ppm by the molecular weight of, e.g., sodium hypochlorite (74.4 grams per mol) to arrive at the equivalent millimolar (mmolar or mM) value. Therefore, a 100 ppm solution of sodium hypochlorite is equivalent to a 1.34 mM sodium hypochlorite solution. In particular embodiments of the described methods, the concentration of sodium hypochlorite used can range from 0.1-10 mg/mL. In one embodiment, the concentration of sodium hypochlorite can be 0.134 mg/mL. However, one of skill would appreciate the need to calculate the concentration of hypochlorite necessary based on the size of the body of water present.

The addition of a hypochlorite can be used to eliminate biuret build up in a natural reservoir of water or in a man-made water reservoir. In particular embodiments, the body of water is a swimming pool, filtration system, decorative fountain, water slide, spa, hot tub, or bathing fountain. In still further embodiments the body of water is an ornamental water source including garden or other ornamental fountains, and waterfalls.

Further described herein are methods for eliminating CYA from a liquid including providing to the liquid an effective amount of an agent that biodegrade CYA to biuret, wherein the agent can be at least one microbial cell culture, an extract thereof, a soluble protein fraction thereof, and CYA amidohydrolase; and subsequently providing an effective amount of a hypochlorite, thereby eliminating both the CYA and the resultant biuret.

In some embodiments, the biuret build-up is resultant of the biodegradation of CYA by an agent. In particular embodiments, the agent can be at least one microbial cell culture, an extract thereof, a soluble protein fraction thereof, and CYA amidohydrolase. The CYA amidohydrolase can be provided in the form of an extract of whole cells, as whole cell powder, as ground whole cells, as components of whole cell extracts and/or can be purified from bacteria that naturally produce the enzyme, including recombinant variants thereof. In other embodiments, the compositions are composed of whole cells expressing the necessary enzyme, which have been processed for introduction to an environment, such as a body of water. A non-limiting examples of such processing include dried cells (by freeze-drying or other method), which have been ground to a powder or powder like material.

In a particular embodiment of the disclosed invention the CYA amidohydrolase is a soluble CYA amidohydrolase. In further embodiments, the CYA amidohydrolase enzyme is provided by a single cell culture or culture extract. In another embodiment, the enzyme is provided by multiple cell cultures or cell culture extracts. For example, the CYA amidohydrolase can be provided by any species of microbe which encodes the enzyme or is capable of expressing it. Non-limiting examples of such microbes include: *Acidovorax citrulli, Acidovorax* citrulli 12227, *Pseudomonas* sp. NRRL B-12228, *Cupriavidus basilensis, Gordonia rubripertincta, Gordonia rubripertincta* DSM 10347/*Williamsia* sp NRRLB-15444R, *Hormodendrum* sp., *Klebsiella pneumoniae, Klebsiella pneumoniae* 90, *Klebsiella pneumoniae* 99, *Moorella thermoacetica, Penicillium* spp., *Pseudomonas* sp., *Pseudomonas* sp. A, *Sporothrix schenckii* and *Stenotrophomonas* sp.

It will be appreciated that enzymatic activity varies from enzyme to enzyme, depending on species and/or method of preparation. Accordingly, the "effective amount" of an enzyme for use in the described methods will vary. More specifically, the effective amount of the enzyme needed for example, to reduce CYA from 100 ppm to 30 ppm will vary from enzyme to enzyme and will also depend on the amount of CYA desired to eliminate. It is understood that once the specific activity of any given enzyme is known, the effective amount can be determined. Moreover, it is understood that the overall speed of the breakdown of CYA can be increased by increased amounts of the described or increased amounts of the constituent enzymes therein.

In particular embodiments, the described CYA amidohydrolase, enzyme has an amino acid sequence that is at least 60%, at least 70%, at least 80%, at least 85%, at least 90%, or at least 95, 96, 97, 98, or 99% identical to the amino acid sequence of CYA amidohydrolase of a bacterium selected from the group consisting of: *Acidovorax citrulli, Acidovorax* citrulli 12227, *Pseudomonas* SP NRRL B-12228, *Cupriavidus basilensis, Gordonia rubripertincta, Gordonia rubripertincta* DSM 10347/*Williamsia* sp. NRRLB-15444R, *Hormodendrum* sp., *Klebsiella pneumoniae, Klebsiella pneumoniae* 90, *Klebsiella pneumoniae* 99, *Moorella thermoacetica, Penicillium* spp., *Pseudomonas* sp., *Pseudomonas* sp. A, and *Sporothrix schenckii* as well as *Stenotrophomonas*, according to the polypeptide sequence of such enzymes found in public sequence databases, such as Genbank. The enzyme variants have equal or substantially similar activity to the wild type enzymes of the above-mentioned bacteria, and are described herein as "functional variants" of the described enzymes.

Functional variants of the described enzyme also include recombinant modifications of wild type versions of the enzymes, such as modifications of the polypeptide set forth herein as SEQ ID NO 1.

In other embodiments the one or more cell culture extracts are a soluble protein-containing fraction of a cell extract. In such soluble fractions, the proteins are not purified from the extract soluble milieu, but they been isolated from much of the non-protein cellular material found in the whole cell extracts. A protein fraction can be obtained by methods well known in the art. For example, it can be obtained by adding to the soluble crude extract a kosmotropic salt, a non-ionic hydrophilic polymer, a polyelectrolyte or a polyvalent metallic ion.

In certain embodiments, the anion of said kosmotropic salt is selected from the group consisting of $PO_4^{3-}$, $SO_4^{2-}$, $COO^-$ and $Cl^-$, and the cation of said kosmotropic salt is selected from the group consisting of $NH^{4+}$, $K^+$ and $Na^+$; the non-ionic hydrophilic polymer is selected from the group consisting of dextran and polyethylene glycol; the polyelectrolyte is selected from the group consisting of alginate, carboxymethycellulose, polyacrylic acid, tannic acid and polyphosphates; and the polyvalent metallic ion is selected from the group consisting of $Ca^{2+}$, $Mg^{2+}$, $Mn^{2+}$ and $Fe_2$. In other particular embodiments, the kosmotropic salt is ammonium sulfate.

In view of the current capabilities of the art, it will be appreciated that the encoding sequence of the enzymatic components of the described composition can be located genomically or as part of a recombinant expression plasmid.

In particular examples, a genomically-located coding sequence is a native part of the genome of the species of bacteria in the cultures used as described herein. In other embodiments, the coding sequence has been inserted into the bacterial genome, either in a non-native location in the native bacteria or in a non-native species. Multiple methods are known in the art for inserting a DNA sequence into a bacterial genome. Non-limiting examples include homologous recombination mediated genomic editing (e.g. CRISPR-mediated) and bacteriophage-mediated transduction.

In other embodiments, one or more enzymatic components of the described methods are encoded by a DNA sequence located on a recombinant expression plasmid that has been introduced (transformed) into a bacterium. Any bacteria capable of transformation and production of the described enzyme can be used. Non-limiting examples of bacteria that can be transformed with an expression plasmid described herein include *Escherichia coli*, *Pseudomonas* spp., (for example strains NRRLB 12228 and ADP), and *Enterobacter cloacae* strain 99.

DNA expression plasmids are standard in the art, and it will be appreciated that any standard expression plasmid can be used to express the described enzyme. Such plasmids will minimally contain an origin of replication, selection sequence (such as, but not limited to an antibiotic resistance gene), and expression control sequences for the gene or genes of interest. Particular non-limiting examples of bacterial expression plasmids include IPTG-inducible plasmids, arabinose-inducible plasmids and the like. Other non-limiting examples of expression induction include light induction, temperature induction, and autoinduction DNA expression plasmids, and custom-made expression plasmids are commercially available from suppliers such as New England Biolabs (Ipswich, MA) and DNA 2.0 (Menlo Park, CA).

In particular embodiments, the CYA amidohydrolase is genomically-encoded (i.e. encoded by and expressed from DNA sequence located in native or non-native genomic locations). In other embodiments, it is located on extra-genomic expression plasmids. In some embodiments, the enzymatic component is expressed from a plasmid. For example, in one embodiment, the cell culture extracts contain CYA amidohydrolase that is genomically-encoded. In other examples the CYA amidohydrolase is plasmid-encoded.

In particular embodiments, the described method can include at least one isolated and purified enzymatic component. Therefore, in particular embodiments, of active enzymatic component of the claimed method is isolated and purified.

Methods of protein purification are standard in the art (for example, see McGettrick and Worrall, *Methods in Molec. Biol.* 244:29-35, 2004). As described above, the CYA amidohydrolase for use in the described method can be expressed genomically or from a recombinant plasmid. Regardless of source, the described enzyme can be isolated and purified as known in the art, using any system able to isolate the expressed enzyme. In a particular example, the expressed enzyme can contain a polyhistadine (e.g., HisX6) tag for use in standard $Ni^{2+}$ affinity chromatography. In another example, the expressed enzyme has an N-terminal or C-terminal glutathione-S-transferase (GST) tag for isolation with glutathione and Strep tag which allows the purification and detection of proteins by affinity chromatography, size exclusion chromatography, immunoprecipitation, and other similar protein purification methods known in the art.

The described method, whether containing cell culture extracts/fractions or isolated and purified components, can be achieved in any manner for use as an additive in environmental purification system, such as water disinfection.

The enzymatic degradation of every 1 mole of CYA will produce 1 mole of biuret. It is understood in the art that 50 ppm CYA is 0.4 mM, considered to be a relatively safe level of CYA. Thus, it can be appreciated that 0.4 mM biuret is about 40 ppm.

The optimal level of CYA is no more than about 30 ppm. Once the CYA ppm level rises above optimum level, chlorine-lock becomes a notable problem. Typically, this occurs around 100 ppm. Accordingly, an agent is added to CYA-containing water to bring the level of CYA between 30-50 ppm. In particular embodiments, prior to addition of the agent, the concentration of chlorine in the water under treatment is lowered to between 0.0 and 0.5 ppm. According to some embodiments of the present disclosure, the agent is CYA amidohydrolase. Following addition of CYA amidohydrolase, the treated water is then left to stand while enzymatic biodegradation of CYA occurs. Incubation time for CYA biodegradation can be anywhere between 2-24 hours, such as 2, 4, 6, 8, 10, 12, 14, 16, 18, 20, 22, 24 hours or more which will bring the CYA to a level down to about 30 ppm. Once optimal levels of CYA has been achieved, a hypochlorite is subsequently provided to the water to bring the ppm level of biuret below 40, optimally 0 ppm.

In particular embodiments, the elimination of biuret is to be carried out through a multistep treatment in which first CYA is degraded, particularly enzymatically for several hours as described above, thereby ensuring optimal levels of CYA, followed by the addition of a hypochlorite to eliminate the resulting biuret. It is important to note that the described treatment utilizes a neutral pH in the pool water (7.2-7.6) for proper enzymatic degradation of CYA and subsequent biuret degradation. This is opposed to prior described methods which use super-chlorination to degrade the CYA. However, such prior methods require a pH of 10 or above in order to degrade the CYA, as described in U.S. Pat. No. 4,075,094. The disclosed invention will not result in CYA degradation due to super-chlorination treatment, since the pool water pH is close to neutral (pH 7).

In some embodiments of the disclosed invention the pH of the aqueous solution during the CYA biodegradation occurs preferably in a pH between 7-8.5, (followed by incubation time), and subsequent super-chlorination. During the super-chlorination, the pH level in the pool water may slightly fluctuate from its neutral level (7.2-7.6). In particular embodiments the pH level of the treated water may range anywhere between 6-9.5, such as a pH of about 6, 6.5, 7, 7.5, 8, 8.5, 9, or 9.5, however it will not reach 10 or above.

In some embodiments of the present disclosure the treatment can include formulations of a CYA degradation agent and a hypochlorite which can be a liquid or liquid-like suspension, slurry, or gel, all of which can be provided in a water-soluble tablet or pellet, similar to pharmaceutical liquigel formulations. In certain embodiments, the treatment described compositions are soluble. In other embodiments, the treatment described compositions are immobilized onto a solid substrate, which is then applied to the liquid to be cleansed of CYA and biuret. In still other embodiments, the treatment described compositions are formulated as a dry powder in which the agent has been lyophilized, which can be further processed into a dissolvable tablet. Additives that can be optionally added to such liquid and dry formulations are standard in the art and include potassium phosphate, phosphate buffered saline solution, or dextran. In some embodiments of the above, the agent it produced in a manner of any of the above described formulations and the hypochlorite is formulated similarly or in a different formulation.

The agent can be in a form of a concentrated solution containing the enzyme and a suitable medium having other ingredient(s) for stabilizing the enzyme, such as buffers, antioxidants, thickeners and the like, as known in the art of stabilizing high concentration protein solutions. The solution can be kept frozen, cooled or at room temperature. The concentrated solution can be added directly into the treated water, or be diluted with a suitable medium before being added to the water.

In other particular embodiments, liquid/semi-liquid, and dry formulations can be further provided in a water-soluble sack, envelope, sachet, and the like. Such water-soluble materials are standard and are commercially available from suppliers including Solupak (Manchester, England) Applied Business Techniques Ltd (Worcester. England), and Harmless Packing for our Future (Ipswich, UK).

In further embodiments the described compositions for biodegradation of CYA and then breaking down biuret can be provided as a two-component pod in which each unit of the pod will dissolve at a different time point. In such a delivery system, the pod is formulated such that the CYA-degrading agent (e.g. CYA-amidohydrolase) is first released upon contact with the aqueous solution. Following release of the agent, and after contact with the water for several hours, the second component of the pod (a hypochlorite) is subsequently released. In particular embodiments, other factors influence the release of the biuret-degrading hypochlorite. For example, in a particular embodiment, a change in levels of CYA attained in the water could influence the delivery of the hypochlorite.

In particular embodiments, the hypochlorite can be released by sustained release, extended release, delayed-release or any other slow release mechanisms known in the art. In some embodiments, the pod may formulated such that the agent is found in a highly soluble coating while the hypochlorite is found in a less soluble coating resulting in its subsequent release. In a further embodiment, the described compositions can be provided in a kit that contains the described compositions and instructions for its use in removing CYA and subsequent treatment of a hypochlorite in order to eliminate the biuret.

The following examples are provided to illustrate certain particular features and/or embodiments. These examples should not be construed to limit the disclosure to the particular features or embodiments described.

EXAMPLES

Example 1: Detection of Biuret on TLC Plate Via Two Reagents

This example shows that biuret can be detected via two different reagents: sodium nitroprussate and toluidine.

Figure 1:
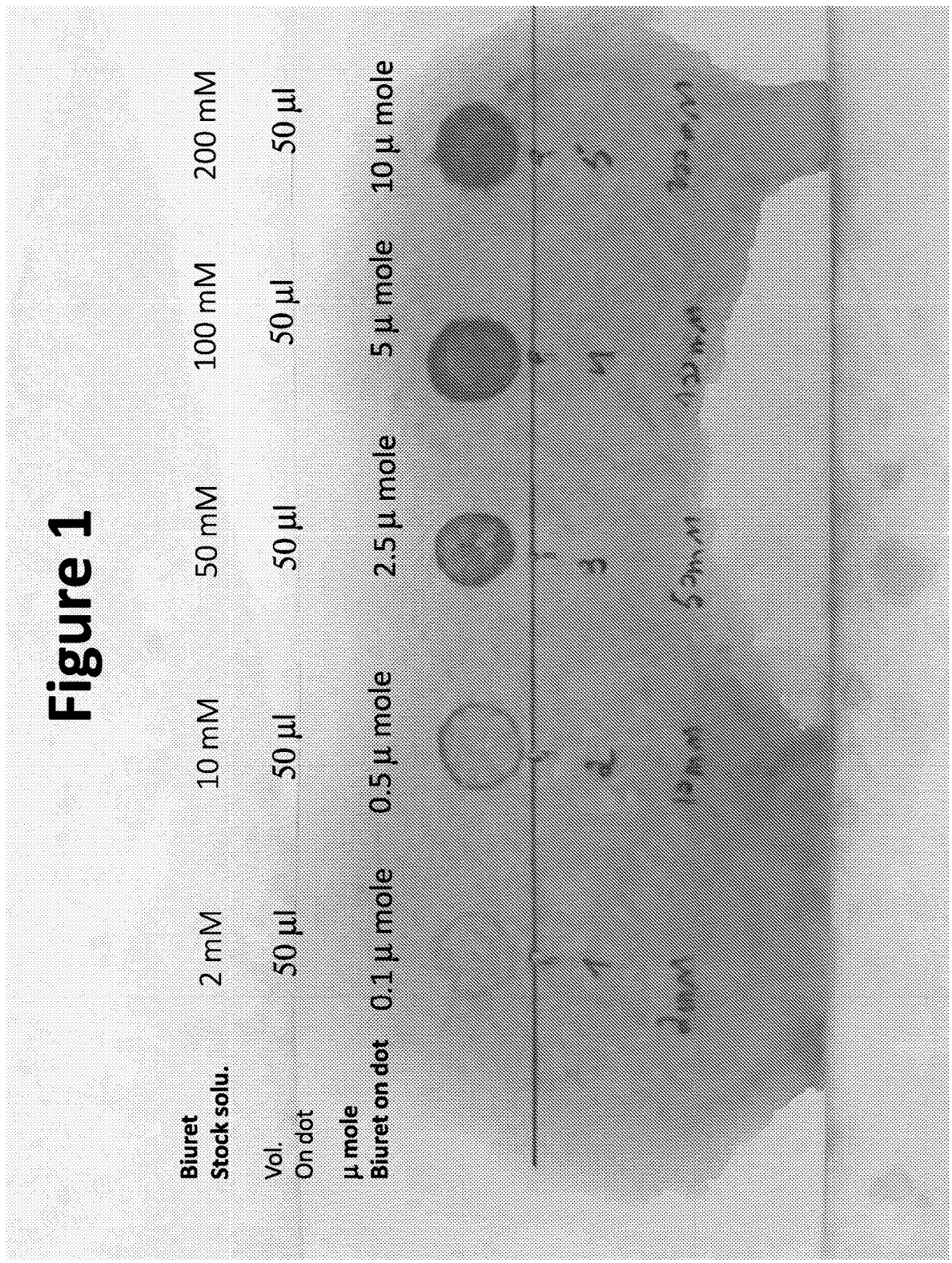
FIG. 1 shows detection of biuret (from stock solution) on a thin layer chromatography (TLC) plate stained with sodium nitroprussate. The five circles indicate increasing amounts of biuret at 0.1, 0.5, 2.5, 5, and 10 µMole, circles 1-5 respectively.
Figure 2:
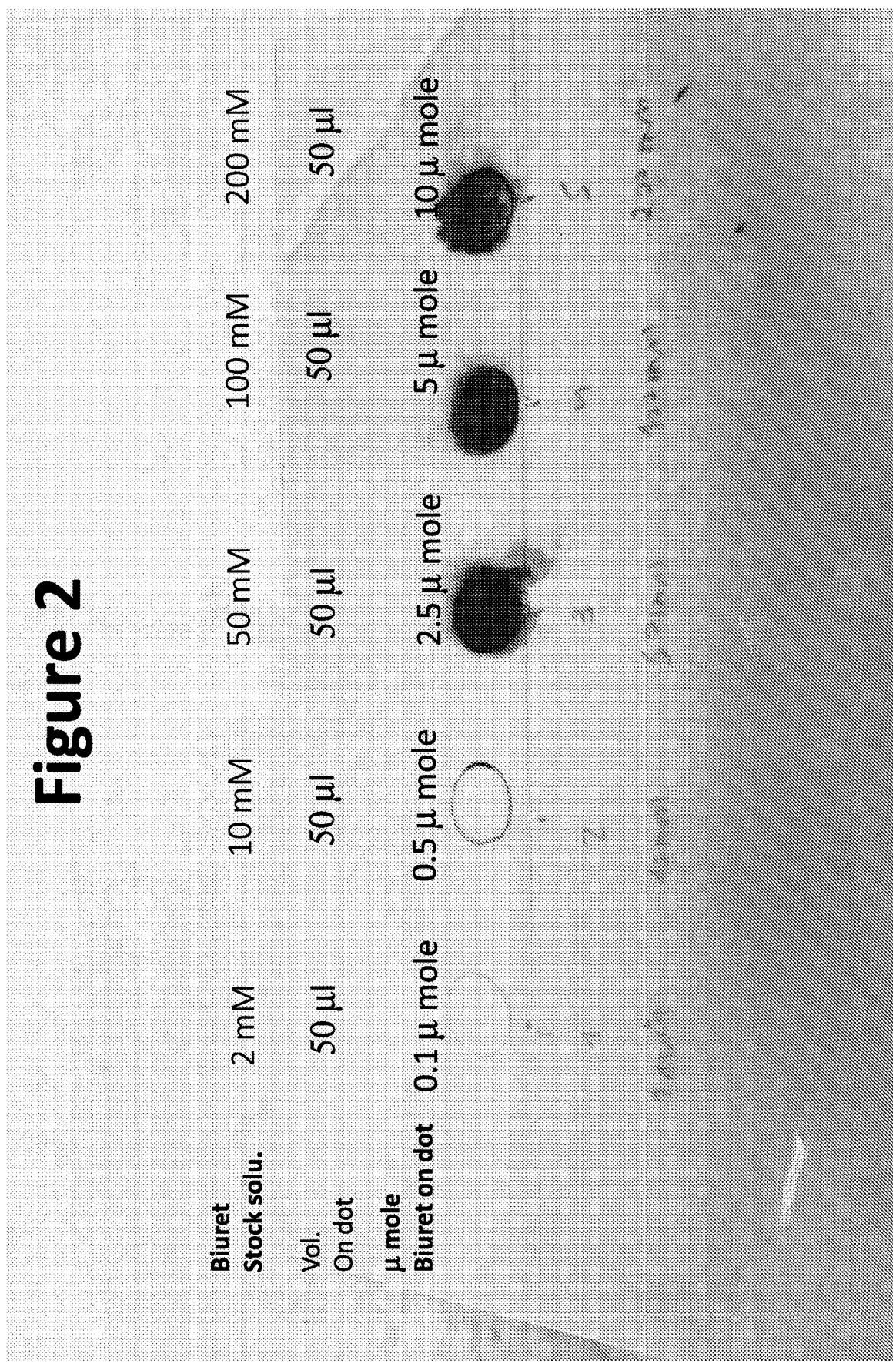
FIG. 2 shows detection of biuret (from stock solution) on a TLC plate stained with toluidine. The five circles indicate increasing amounts of biuret at 0.1, 0.5, 2.5, 5, and 10 µMole, circles 1-5 respectively.

Biuret (from stock solution) was prepared in increasing concentrations of 2, 10, 50, 100 and 200 mM. 50 µl was loaded at each point in 10 µl amounts, and dried between the 5 loadings. In two separate experiments the plates were sprayed with sodium nitroprussate+potassium hexacyanoferrate (FIG. 1) and toluidine (FIG. 2).

The nitroprussate+potassium hexacyanoferrate spray contains 1 volume part each of 10% aqueous sodium hydroxide, 10% sodium nitroprussate 10% potassium hexacyanoferrate with 3 volume parts water. The plate sat for at least 20 minutes at room temperature, the reagent was mixed with an equal part of acetone and spray was applied to the plate. The plate was imaged immediately every 1-2 minutes, until color developed. As seen in FIG. 1, the sodium nitroprussate spray applied on the TLC plate is an effective and sensitive method for detecting biuret. Detection of biuret was possible as at a concentration of 0.5 µMole.

The toluidine spray contains 160 mg o-toluidine in 30 ml glacial acetic acid, filled to 500 ml with distilled water, plus 1 gram KI solution. The plate was placed for 15-20 minutes in a chlorine atmosphere (e.g., Potassium permanganate+10% hydrochloric acid). It was then left for 5 minutes at ambient temperature until the chlorine evaporated completely and then sprayed. The plate was imaged immediately every 1-2 minutes, until color developed. As seen in FIG. 2, the toluidine spray applied on the TLC is an effective method for detecting biuret. Detection of biuret was clearly visible at 2.5 µMole and slightly visible at a concentration of 0.5 µMole.

Example 2: Use of Super-Chlorination to Eliminate Biuret

This example shows that a hypochlorite can successfully eliminate biuret from an aqueous solution.

NaOCl was added to tubes at the following increasing concentrations: 0, 5, 10, 20, 30, 40 and 80 mg/mL. Biuret (100 mM stock solution) was added to each tube at a final concentration of 50 mM per tube. Reaction tubes were prepared as shown in table 1 below.

TABLE 1

Figure 3:
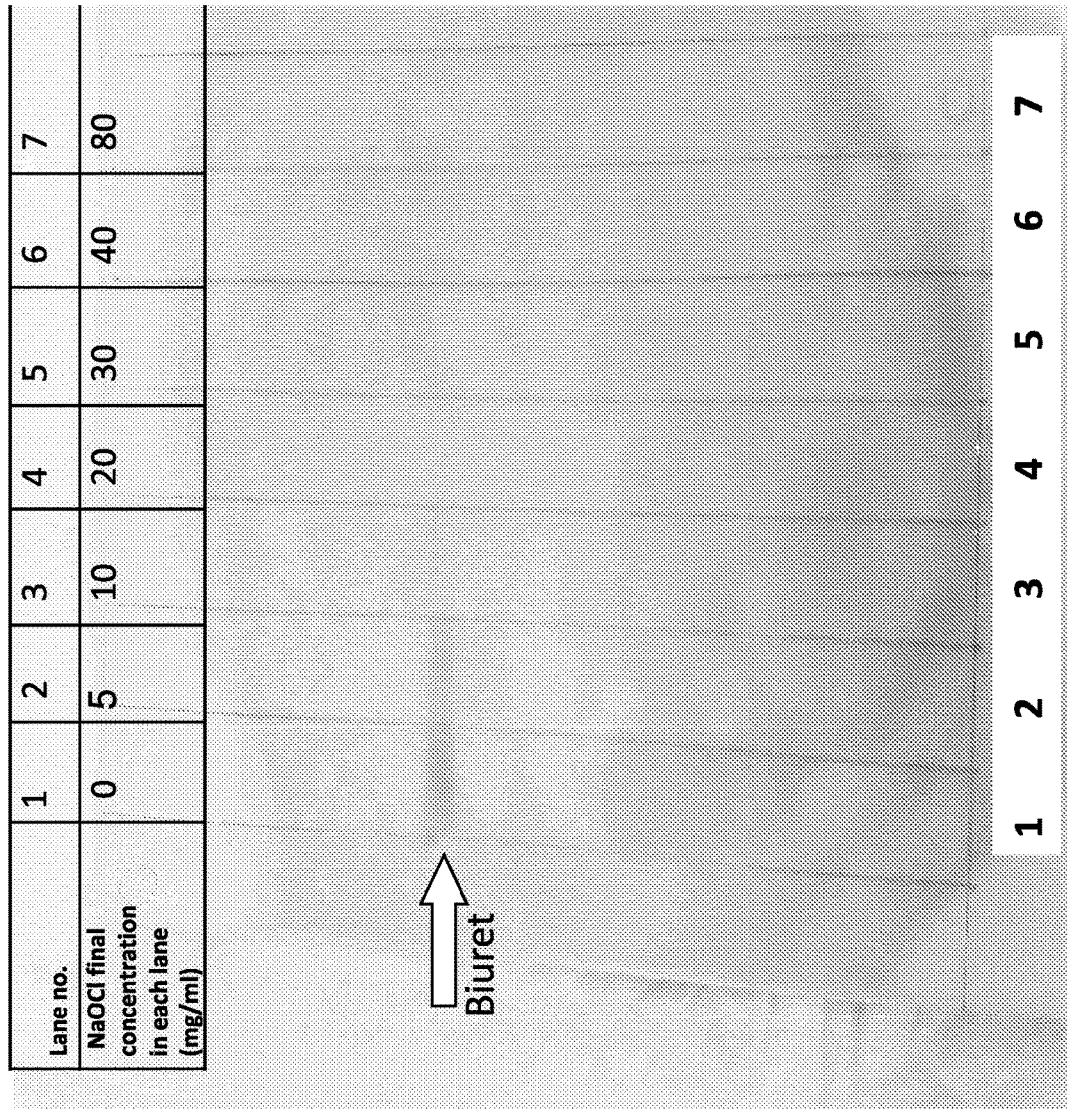
FIG. 3 shows hydrolysis of 2.5 micromole biuret (from stock solution) by overnight super-chlorination with NaOCl provided at 0, 5, 10, 20, 30, 40 and 80 mg/mL, lanes 1-7 respectively. Biuret was undetectable upon reaction with NaOCl at 10 mg/mL (lane 3) or higher. TLC plate was stained with sodium nitroprussate.

Reaction tube preparation for the TLC protocol of FIG. 3

| | Reaction tube no. | | | | | | |
|---|---|---|---|---|---|---|---|
| | 1 | 2 | 3 | 4 | 5 | 6 | 7 |
| Vol. Biuret from stock 100 mM | 0.5 ml | 0.5 ml | 0.5 ml | 0.5 ml | 0.5 ml | 0.5 ml | 0 ml |
| Vol. NaOCl from relevant stocks tubes (mg/ml) | 0.5 ml WFI | 0.5 ml From 10 mg/ml | 0.5 ml from 20 mg/ml | 0.5 ml from 40 mg/ml | 0.5 ml from 60 mg/ml | 0.5 ml from 80 mg/ml | 0.5 ml from 80 mg/ml |
| NaOCl concentration in each reaction tube (mg/ml) | 0 | 5 | 10 | 20 | 30 | 40 | 80 |

TABLE 1-continued

Reaction tube preparation for the TLC protocol of FIG. 3

| | Reaction tube no. | | | | | | |
|---|---|---|---|---|---|---|---|
| | 1 | 2 | 3 | 4 | 5 | 6 | 7 |
| Biuret final con. in each reaction tube (mM) | 50 | 50 | 50 | 50 | 50 | 50 | 0 |
| Biuret in each dot (micromole) | 2.5 | 2.5 | 2.5 | 2.5 | 2.5 | 2.5 | 0 |

The tubes were left to incubate overnight, at room temperature. A total of 50 micro L from each tube was pipetted onto each lane of a TLC plate (See FIG. 3) in 5 aliquots of 10 micro L each. After absorption onto the TLC plate, it was immersed in running solvent, 60% Isopropanol, 10% ammonia, the mobile phase of the reaction. Upon completion of running and drying, the TLC was stained via the sodium nitroprussate method as described in Example 1. The plate was imaged immediately every 1-2 minutes, until color developed.

Super-chlorination using NaOCl degrades biuret in a sample in the following reaction:

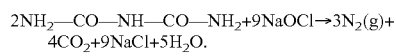
$2NH_2-CO-NH-CO-NH_2+9NaOCl \rightarrow 3N_2(g)+4CO_2+9NaCl+5H_2O$.

Accordingly, the degradation of each mole of biuret requires 4.5 moles sodium hypochlorite (as an illustrative hypochlorite). Likewise, in a particular example, 1.8 mM sodium hypochlorite is required to degrade 0.4 mM biuret. If 1M of NaOCl has a molecular weight of 74.44 mg/ml), then in terms of mg/ml, there is a requirement for about 0.134 mg/ml NaOCl to degrade an aqueous solution of 0.4 mM biuret.

Example 3: Biodegradation of CYA & Elimination of Biuret in UPW

As demonstrated in Example 2, biuret (from stock solution) is shown to be eliminated through treatment with super-chlorination. Example 3 demonstrates the elimination of biuret, resultant from CYA biodegradation in UPW. TLC was performed to detect the biodegradation of CYA and elimination of biuret by super-chlorination in UPW. 50 mM CYA (Sigma) was biodegraded by the recombinant CYA amidohydrolase (AtzD) which in turn produced 50 mM of biuret. Expression vector pET41b, expressing the AtzD sequence (*Pseudomonas* SP NRRL B-12228), was prepared and provided by GenScript Biotech (New York, USA), transformed and grown in *E. coli* BL21. The cells were grown and induced according to standard procedures, cells were burst and recombinant CYA amidohydrolase was provided in CE. Reaction tubes were prepared as described in Table 2 below:

TABLE 2

Figure 4:
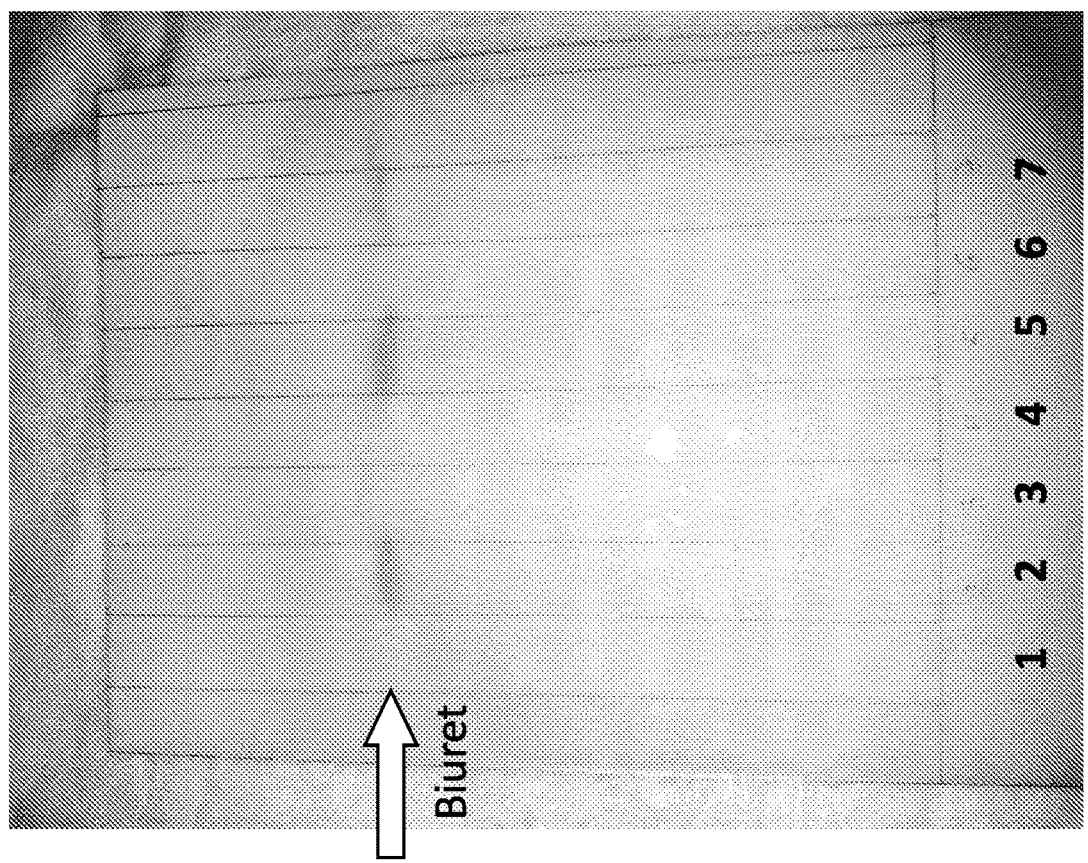
FIG. 4 shows that biuret produced by enzymatic degradation of CYA in UPW is effectively removed by overnight super-chlorination. Biuret was detected with sodium nitroprussate.
Lane 1: CYA alone. No stained band was detected.
Lane 2: CYA treated with CYA amidohydrolase that produces biuret. Biuret band was detected.
Lane 3: CYA treated with CYA amidohydrolase that produces biuret and then with NaOCl 20 mg/mL. The biuret band disappeared.
Lane 4: NaOCl 20 mg/ml alone. No stained band was detected.

Description of reaction tubes for TLC in FIG. 4

| Reaction Tube no. | Reaction tube treatment | DDW | CYA stock 100 mM | Biuret stock 100 mM | CE (1:1 in Gly) Final dilu. 1:120 | NaOCl 120 mg/ml |
|---|---|---|---|---|---|---|
| 1 | CYA 50 mM | 10 ml | 10 ml | | | |
| 2 | CYA 50 mM + CE | 9.67 ml | 10 ml | | 330 micro L | |
| 3 | CYA 50 mM + CE + NaOCl | 7.67 ml | 12 ml | | 330 micro L | 2 ml |
| 4 | NaOCl | 10 ml | | | | 2 ml |
| 5 | Biuret 50 mM | 10 ml | | 10 ml | | |
| 6 | Biuret 50 mM + NaOCl | 8 ml | | 12 ml | | 4 ml |
| 7 | Biuret stock 16 mM | | | | | |

In the current example, and as shown in FIG. 3, super-chlorination at a concentration of 10 mg/ml NaOCl drastically reduced the level of biuret provided at a concentration of 50 mM, demonstrating almost complete elimination. This example successfully demonstrates that super-chlorination is an effective means of biuret elimination.

The tubes were left to incubate overnight, at room temperature then boiled and centrifuge. A total of 50 micro L from each tube was pipetted on each lane of the TLC in 5 aliquots of 10 micro L. After absorption on the TLC, the plate was subsequently immersed in a solvent, 60% Isopropanol, 10% ammonia. Upon completion of chromatography and drying of the TLC plate, it was stained via the sodium nitroprussate method as described in Example 1. The plate was imaged immediately every 1-2 minutes, until color developed (FIG. 4).

Lane 1, CYA alone, as a negative control, CYA was not stained (due to the specificity of sodium nitroprussate for biuret).

Lane 2, biuret the resultant of the enzymatic degradation of CYA was stained. The intensity of the band appears identical to the positive control, lane 5, biuret (from stock solution) alone, which was stained.

Lane 3, is replicative of lane 2, however it was followed by 20 mg/ml super-chlorination treatment, effectively degrading the biuret, and observably by lack of staining.

Lane 4, NaOCl alone, was run as another negative control, and no band was detected.

Lane 5, Biuret (from stock solution), untreated.

Lane 6 biuret (from stock solution) followed by super-chlorination with NaOCl, resulting in the degradation of biuret.

Lane 7 shows the staining of 0.008 millimoles of biuret (from stock solution). This mimics the final 0.4 mM concentration of biuret that will be found in a swimming pool after biodegradation of 50 ppm of CYA. 2 ml was dried in a Speedvac concentrator and re-suspended in 50 micro L DDW then loaded onto the TLC. Lane 7 demonstrates that this method is effective in detecting low concentrations of biuret found in swimming pool.

Example 3 demonstrates the ability of super-chlorination to degrade biuret originated from the biodegradation of CYA present in UPW.

Example 4: Biodegradation of CYA & Elimination of Biuret in Swimming Pool Water As demonstrated in Example 3, biuret originated from the biodegradation of CYA, can be eliminated in UPW. Example 4 displays the ability of super-chlorination to effectively eliminate biuret, the by-product of CYA, from a water sample taken from a swimming pool. TLC was performed as shown in the Example 3, lanes 1-6, with the exception that the water sample was taken from a swimming pool.

The tubes were left to incubate overnight, at room temperature then boiled and centrifuge. A total of 50 micro L from each tube was pipetted on each lane of the TLC in 5 aliquots of 10 micro L. After absorption on the TLC, the plate was subsequently immersed in a solvent, 60% Isopropanol, 10% ammonia. Upon completion of chromatography and drying of the TLC plate, it was stained via the sodium nitroprussate method as described in Example 1. The plate was imaged immediately every 1-2 minutes, until color developed (FIG. 5).

Lane 1, CYA alone, a negative control, CYA was not stained (due to the specificity of sodium nitroprussate for biuret).

Lane 2, biuret the resultant of the enzymatic degradation of CYA was stained. The intensity of the band appears identical to the positive control, lane 5, biuret (from stock solution) alone, which was stained.

Lane 3, is replicative of lane 2, however it was followed by super-chlorination treatment 20 mg/ml, effectively degrading the biuret, and observably by lack of staining.

Lane 4, NaOCl alone, was run as another negative control, and no band was detected.

Lane 5, Biuret (from stock solution), untreated.

Lane 6 Biuret (from stock solution) followed by super-chlorination with NaOCl, resulting in the degradation of biuret observably by lack of staining.

These experiments demonstrate the ability to effectively eliminate biuret produced by enzymatic bio-degradation of CYA in swimming pool water without the need to increase the pH level of the pool water.

The disclosed examples provide the ability to save billions of cubic meters of water worldwide, and can prevent groundwater contamination of CYA and biuret.

In view of the many possible embodiments to which the principles of the disclosed invention can be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

TABLE 3 preparation of reaction tubes for TLC in FIG. 5

| Reaction Tube no. | Reaction tube treatment | DDW | CYA stock 100 mM | Biuret stock 100 mM | CE (1:1 in Gly) Final dilu. 1:120 | NaOCl 120 mg/ml |
|---|---|---|---|---|---|---|
| 1 | CYA 50 mM | 10 ml | 10 ml | | | |
| 2 | CYA 50 mM + CE | 9.67 ml | 10 ml | | 330 micro L | |
| 3 | CYA 50 mM + CE + NaOCl | 7.67 ml | 12 ml | | 330 micro L | 2 ml |
| 4 | NaOCl | 10 ml | | | | 2 ml |
| 5 | Biuret 50 mM | 10 ml | | 10 ml | | |
| 6 | Biuret 50 mM + NaOCl | 8 ml | | 12 ml | | 4 ml |

I claim:

1. A method for eliminating biuret from an aqueous solution, comprising:
providing an effective amount of a composition comprising a hypochlorite to a biuret-containing liquid, thereby eliminating the biuret, wherein the temperature of the biuret-containing liquid is about room temperature and the biuret-containing liquid is at about neutral pH.

2. The method of claim 1, wherein the hypochlorite is selected from the group consisting of sodium hypochlorite, potassium hypochlorite, and calcium hypochlorite.

3. The method of claim 2, wherein the hypochlorite is sodium hypochlorite, and wherein the effective amount is a concentration of 0.1-10 mg/ml.

4. The method of claim 1, wherein the liquid is water in a swimming pool, water slide, spa, hot tub, fountain, decorative waterfall or any other man-made water reservoir.

5. The method of claim 1, wherein the liquid is water from a natural reservoir of water.

6. The method of claim 1, wherein the biuret in the liquid is a resultant product from enzymatic biodegradation of cyanuric acid (CYA).

7. A method for eliminating cyanuric acid (CYA) from a liquid comprising:
providing to the liquid an effective amount of an agent that degrades CYA to biuret to produce a biuret-containing liquid, wherein the agent is selected from the group consisting of at least one microbial cell culture, an extract thereof, a soluble protein fraction thereof, and CYA amidohydrolase; and subsequently providing an effective amount of a hypochlorite to the biuret-containing liquid, thereby eliminating the CYA and the resultant biuret, wherein the temperature of the biuret-containing liquid is about room temperature and the biuret-containing liquid is at about neutral pH.

8. The method of claim 7, wherein the extract is of a single microbial cell culture.

9. The method of claim 8, wherein the CYA amidohydrolase is expressed by at least one recombinant nucleic acid in a cell culture.

10. The method of claim 9, wherein the CYA amidohydrolase is expressed genomically in a microorganism.

11. The method of claim 7, wherein the CYA amidohydrolase is from one or more microorganisms selected from the group consisting of: *Acidovorax citrulli*, *Acidovorax citrulli* 12227, *Pseudomonas* sp. NRRL B-12228, *Cupriavidus basilensis*, *Gordonia rubripertincta*, *Gordonia rubripertincta* DSM 10347/*Williamsia* sp. NRRLB-15444R, *Hormodendrum* sp., *Klebsiella pneumoniae*, *Klebsiella pneumoniae* 90, *Klebsiella pneumoniae* 99, *Moorella thermoacetica*, *Penicillium* spp., *Pseudomonas* spp., *Stenotrophomonas* sp. and *Sporothrix schenckii*.

12. The method of claim 11, wherein the CYA amidohydrolase is an isolated enzyme or a functional variant thereof.

13. The method of claim 12, wherein the CYA amidohydrolase is from *Pseudomonas* sp. NRRL B-12228.

14. The method of claim 7, wherein the hypochlorite is selected from the group consisting of sodium hypochlorite, potassium hypochlorite, and calcium hypochlorite.

15. The method of claim 7, wherein the liquid is water from a natural reservoir of water or man-made reservoir of water.

16. The method of claim 14, wherein the concentration of sodium hypochlorite is 0.1-10 mg/ml.

17. The method of claim 14, wherein the concentration of sodium hypochlorite is 1 mg/ml.

* * * * *